(12) United States Patent
Grüdl et al.

(10) Patent No.: US 12,729,758 B2
(45) Date of Patent: Sep. 8, 2026

(54) KINEMATIC COMPONENT

(71) Applicant: GRAMMER Aktiengesellschaft, Ursensollen (DE)

(72) Inventors: Alexander Grüdl, Teuschnitz (DE); Marco Redwitz, Barbing (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 183 days.

(21) Appl. No.: 18/637,811

(22) Filed: Apr. 17, 2024

(65) Prior Publication Data

US 2024/0360892 A1 Oct. 31, 2024

(30) Foreign Application Priority Data

Apr. 27, 2023 (DE) .................... 10 2023 110 934.0

(51) Int. Cl.
*G05D 3/20* (2006.01)
*F16H 37/12* (2006.01)
*B60H 1/34* (2006.01)

(52) U.S. Cl.
CPC ............. *F16H 37/122* (2013.01); *G05D 3/20* (2013.01); *B60H 2001/3471* (2013.01)

(58) Field of Classification Search
CPC .. B60H 2001/3471; G05D 3/20; F16H 37/122
See application file for complete search history.

(56) References Cited

U.S. PATENT DOCUMENTS

2022/0212521 A1* 7/2022 Groben .............. B60H 1/00871

FOREIGN PATENT DOCUMENTS

| | | |
|---|---|---|
| DE | 102014105273 | 6/2015 |
| DE | 102015000874 | 7/2016 |
| DE | 102018112808 | 3/2019 |
| DE | 102021100125 | 7/2022 |
| DE | 202023100756 | 2/2023 |
| DE | 202023100757 | 4/2023 |

OTHER PUBLICATIONS

Official Action for Germany Patent Application No. 102023110934.0, dated Nov. 30, 2023, 5 pages.

* cited by examiner

*Primary Examiner* — Randell J Krug
(74) *Attorney, Agent, or Firm* — Sheridan Ross P.C.

(57) ABSTRACT

A kinematic component comprising a first movably adjustable component, a second movably adjustable component and a device which is provided and designed to adjust the movably adjustable components independently of each other, and wherein the device is provided and designed to recognise a first reference position of the first movably adjustable component and a second reference position of the second movably adjustable component, wherein the device is further provided to reference the first movably adjustable component upon recognition of the first reference position and to reference the second movably adjustable component upon recognition of the second reference position.

16 Claims, 12 Drawing Sheets

2
19
39
3
18
V

C - C
2
3

D - D
2
3
39
29
42

KINEMATIC COMPONENT

CROSS REFERENCE TO RELATED APPLICATION

This application claims the benefit of German Patent Application No. 10 2023 110 934.0, filed Apr. 27, 2023, the contents of which are incorporated herein by reference in its entirety.

FIELD

The present patent application relates to a kinematic component with a first and a second movably adjustable component.

BACKGROUND

For example, kinematic components such as air vents, headlights and the like are known from the prior art, some of which can reference themselves as soon as they recognise an end stop. If a second end stop is then travelled to, intermediate positions can be travelled to iteratively, as the driving actuator now knows the limits and can travel to intermediate positions by step counting. This is familiar from headlights with bend lighting, for example, which initially perform a left-right movement when the vehicle is started. As these actuators then count the steps taken during a movement, the actuators know which position they are in and therefore also which position the actuated components are in, for example the angle of a slat for air deflection, the direction of the light cone in headlights, etc.

SUMMARY

It becomes difficult for such actuators if no end stops are provided, as is the case with endless rotating movements, for example. If the actuator loses its pre-stored reference, for example due to errors or a power failure, the system no longer knows the actual position of the individual parts. It is then important to interrogate the position at regular intervals in order to re-acquire the reference. The steps can then be counted again in order to be able to move to the desired positions. A component moved by the actuator actuates a sensor by means of a cam or a pin as soon as the component reaches a certain position/position. In this way, referencing is detected and the actuator now knows its position. If there are several actuators, a sensor is required for each one.

It is therefore the task of the present application to provide a kinematic component with a device by means of which referencing can be carried out particularly easily, whereby the number of sensors and actuators can be reduced.

The underlying problem is solved by a kinematic component and method with the features as disclosed herein.

According to embodiments of the present disclosure, it is a core idea of the present application to provide a kinematic component with a first movably adjustable component, a second movably adjustable component and a device which is provided and designed to adjust the movably adjustable components independently of one another. Preferably, the device is provided and designed to recognise a first reference position of the first movably adjustable component and a second reference position of the second movably adjustable component. Further preferably, the device is further provided for referencing the first movably adjustable component when the first reference position is recognised and for referencing the second movably adjustable component when the second reference position is recognised.

A kinematic component is to be understood as a component which comprises several movable components by means of which a function assigned to the component can be set. A purely exemplary and non-exhaustive example of such a component could be an air vent (also known as a ventilation nozzle) with several louvres, a headlight or similar.

A movably adjustable component can be understood in such a way that the function assigned to the kinematic component can be changed or adjusted by the movably adjustable components. In the example of the air vent, the movably adjustable components can be the louvres, which can deflect the air flow accordingly.

The term "reference position" can be understood as the position at which the respective movably adjustable component is assigned a certain position or position of the movably adjustable component. If it is recognised that a movably adjustable component has assumed or assumes the respective associated reference position, the movably adjustable component can be referenced on the basis of this knowledge, i.e. every other position is known starting from the reference position of the movably adjustable component, so that in particular a zero position is also known, whereby preferably the zero position can be defined as the position in which the assigned function is least impaired. Using the example of the air outlet, this can be a position of the louvre that the louvre is parallel to the air flow and therefore does not deflect the air flow. The reference position can depend on other parameters, as shown in more detail below according to preferred embodiments. The assignment of the reference position must be unambiguous so that a corresponding referencing of the correct movably adjustable component is possible and can be carried out.

According to a particularly preferred embodiment, the first reference position is a maximum position of the first movably adjustable component and the second reference position is a maximum position of the second movably adjustable component.

A maximum position can be understood to mean that the corresponding movably adjustable component cannot be displaced any further in one direction. Preferably, however, no end stop is provided or the respective movably adjustable component is free of end stops. Instead, by recognising the respective maximum position, it is possible to conclude that an end of movement has been reached.

According to a particularly preferred embodiment, it can therefore be provided that the device comprises a sensor unit which is intended and designed to recognise the reference positions. Particularly preferably, the reference position depends on the direction of rotation of an actuator. Particularly preferably, when the reference position or the maximum position is reached, the further movement of the movably adjustable component is terminated or stopped.

Therefore, instead of an end stop, the provision of end stops can be dispensed with by recognising a reference position by means of a sensor unit.

The sensor unit is particularly preferably intended and designed to recognise the reference positions of the movably adjustable components. Preferably, the detection is in interaction with the movably adjustable components in a direct or indirect context, for example by means of components arranged in between which are operatively connected to the movably adjustable components.

According to a preferred embodiment, the sensor unit can be designed to be particularly simple and cost-effective if the sensor unit has a sensor. It is conceivable that the sensor could be a Hall sensor, a magnetic sensor, a capacitive sensor, an optical sensor or a mechanically actuated sensor. Preferably, the mechanically actuated sensor can be a push-button or tactile sensor. In order to actuate the mechanically actuated sensor, it may preferably be provided that the sensor unit comprises the sensor and an elastically deformable actuating element, the actuating element preferably being at least operatively connected to the first movably adjustable component and to the second movably adjustable component.

Further preferably, the actuating element can be deformed in such a way that the actuating element actuates the sensor, which can correspond to the respective reference position.

The elastically deformable actuating element is operatively connected to the movable adjustable components in such a way that the actuating element is elastically deformed by a movement or actuation of the movable adjustable components.

The sensor is preferably a push-button or a push-button element. This means that when the button is actuated, a corresponding signal can be output, and when the button is not actuated, no signal is output.

If a corresponding reference position is recognised, a corresponding signal can be output to the device, whereby further movement beyond the reference position can be suppressed or not carried out.

The sensor unit can be designed in such a way that, according to a preferred embodiment, the sensor is arranged in a fixed position with respect to the device. Further preferably, the actuating element has an elongated extension. Preferably, the actuating element has a first end and a second end, wherein the first end is fixedly connected to the sensor or a further part of the device. Further preferably, the second end is at least operatively connected to the first movably adjustable component and the second movably adjustable component. The actuating element can be elastically deformed by the actuation or movement of the movably adjustable components. The second end of the actuating element can therefore be moved and/or deformed by the movably adjustable components.

According to a further particularly preferred embodiment, it is provided that the device comprises a drive unit. The drive unit can be connected to the first movably adjustable component and the second movably adjustable component in such a way that the first movably adjustable component and/or the second movably adjustable component can be actuated by actuating the drive unit.

Further preferably, the drive unit can be actuated by an actuator and/or have the actuator. Particularly preferably, the actuator is designed such that it can have a first direction of rotation and a second direction of rotation. It is further preferable that the first movably adjustable component can be actuated when the first direction of rotation is present and the second movably adjustable component can be actuated when the second direction of rotation is present. This makes it possible to actuate the movably adjustable components depending on the direction of rotation or depending on the respective direction of rotation and consequently independently of each other.

Accordingly, the drive unit is preferably designed and provided in such a way that the first movably adjustable component can be actuated when the first direction of rotation is present and the second movably adjustable component can be actuated when the second direction of rotation is present.

The first direction of rotation and the second direction of rotation are particularly preferably opposite to each other.

Such an actuator can be designed particularly simply if the actuator is an electric motor.

According to a further preferred embodiment, it may be provided that the device has a first actuating element and a second actuating element, wherein preferably the first actuating element is connected to the drive unit and the first movably adjustable component and the second actuating element is connected to the drive unit and the second movably adjustable component. By providing these actuating elements, it may be possible to make the transmission from the actuator via the drive unit to the movably adjustable components more compact, since the respective components can be connected to one another in a space-saving manner. The actuating elements are also preferably in active contact with the sensor unit, more preferably with the actuating element or the sensor.

According to a further preferred embodiment, it may be provided that the device has an evaluation unit, which is preferably provided and designed to reference the associated movably adjustable component by recognising the respective reference position and the respective direction of rotation. Further preferably, the reference position can be understood as a function of the direction of rotation. Preferably, the evaluation unit can be a separate component, a component already located in a vehicle, for example the central control unit (ECU) and/or a control unit integrated in the (driving) actuator.

Since it is possible that the two movably adjustable components can act on the sensor unit due to the interaction with the actuating element, it is initially not possible to determine which movably adjustable component actually actuates the sensor unit. By additionally knowing the direction of rotation of the actuator, it can be deduced which movably adjustable component actuates the sensor unit. The first movably adjustable component can be actuated in the first direction of rotation and the second movably adjustable component in the second direction of rotation. The fact that the movably adjustable components are actuated independently of each other means that the direction of rotation is clearly assigned to the respective movably adjustable component.

The underlying task is also solved by a method for referencing a kinematic component according to one of the preceding embodiments.

The method for referencing a kinematic component can be characterised by the following method steps:

a) Actuation of a kinematic component;

a) recognising an actuation of a sensor unit by recognising a reference position, b) processing the recognised reference position as a function of a respective direction of rotation in order to recognise which movably adjustable component is to be referenced;

c) referencing the recognised movably adjustable component.

According to a preferred embodiment, it can also be provided that referencing can already be carried out before the kinematic component is actuated. For example, referencing can be carried out when a vehicle is started, after a battery change or similar. It can be provided that the actuator is actuated by recognising a trigger signal until a reference position is recognised, whereby referencing is possible.

According to a further preferred embodiment, the device is free of end stops. This makes it possible to avoid unwanted stops of components, which can lead to damage. Preferably, it can be provided that the drive unit is designed in such a way that an endlessly rotating movement is possible for both the first movably adjustable component and the second movably adjustable component.

It is particularly preferable that an endless rotating movement in a first direction of rotation is possible with regard to the first movably adjustable component and an endless rotating movement in a second direction of rotation, which is opposite to the first direction of rotation, is possible with regard to the second movably adjustable component.

Further embodiments and configurations in the embodiments are applicable to the other embodiments and can be freely combined with one another, provided that they do not correspond to opposing embodiments.

Further advantageous embodiments are shown in the subclaims.

Further objectives, advantages and usefulness of the present invention can be seen from the following description in conjunction with the drawings.

The invention is illustrated in more detail below in connection with the figures.

DETAILED DESCRIPTION

In the figures, identical components are to be understood with the corresponding reference signs. For the sake of clarity, components may not be labelled with a reference symbol in some figures, but have been designated elsewhere.

The following figures are examples of a kinematic component 1, which is designed as an air vent. However, the designs, embodiments and the like are also transferable to other kinematic components in an analogous manner. The examples shown are for the purpose of explanation and functionality and are not intended to be exhaustive or restrictive with regard to the kinematic component 1.

Figures 1A, 1B:
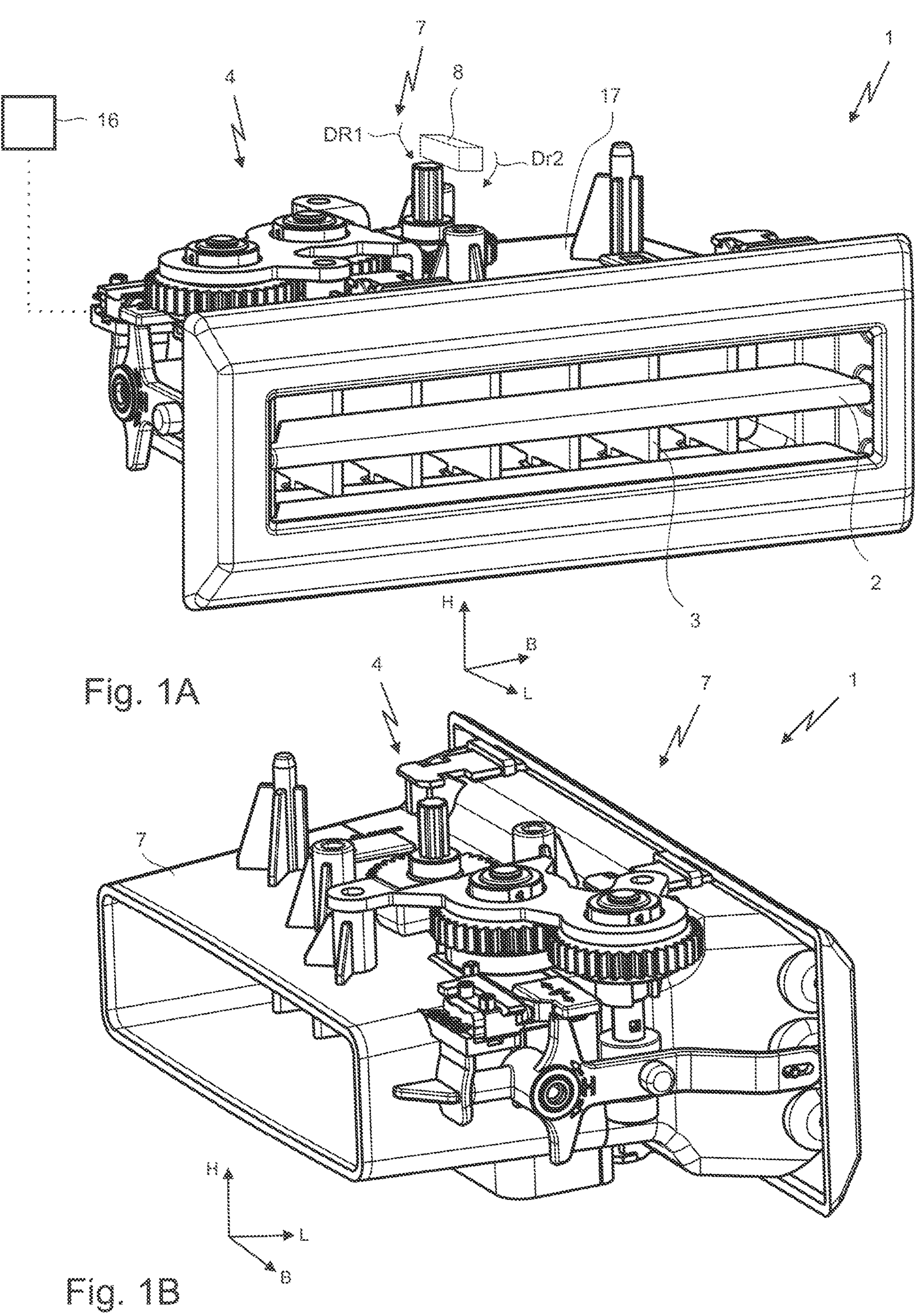
FIG. 1A a kinematic component according to one embodiment in a perspective view from the front, FIG. 1B a perspective view of the kinematic component according to FIG. 1A from the rear.

In FIG. 1A, a kinematic component 1 is shown as an example in a perspective view from the front, which is preferably an air vent. The kinematic component 1 comprises a first movably adjustable component 2, represented by horizontally extending lamellae, and a second movably adjustable component 3, represented by vertically extending lamellae.

A device 4 is also shown, which is intended and designed to adjust the movably adjustable components 2, 3 independently of one another. Further preferably, the device 4 is provided and designed to recognise a first reference position of the first movably adjustable component 2 and a second reference position of the second movably adjustable component 3. Furthermore, the device 4 comprises a drive unit 7, which is connected to a rotatable actuator 8 on the one hand and to the first movably adjustable component 2 and the second movably adjustable component 3 on the other hand, wherein the drive unit 7 can be actuated by means of the actuator 8 and the first movably adjustable component 2 can be adjusted in a first direction of rotation DR1 of the actuator 7 and the second movably adjustable component 3 can be adjusted in a second direction of rotation DR2, which is opposite to the first direction of rotation DR1.

In FIG. 1B, the kinematic component 1 of FIG. 1A is shown in a perspective view from behind.

In general, the kinematic component 1 can be installed in a further part, for example in an interior of a vehicle or the like.

By actuating the movably adjustable components 2, 3, in the present embodiment, it is possible to deflect an air flow, which is guided through the air duct 17, accordingly.

The first movably adjustable component 2 deflects the air flow in a height direction H upwards and downwards and the second movably adjustable component 3 deflects the air flow in a width direction B to the left and right.

Figure 1C:
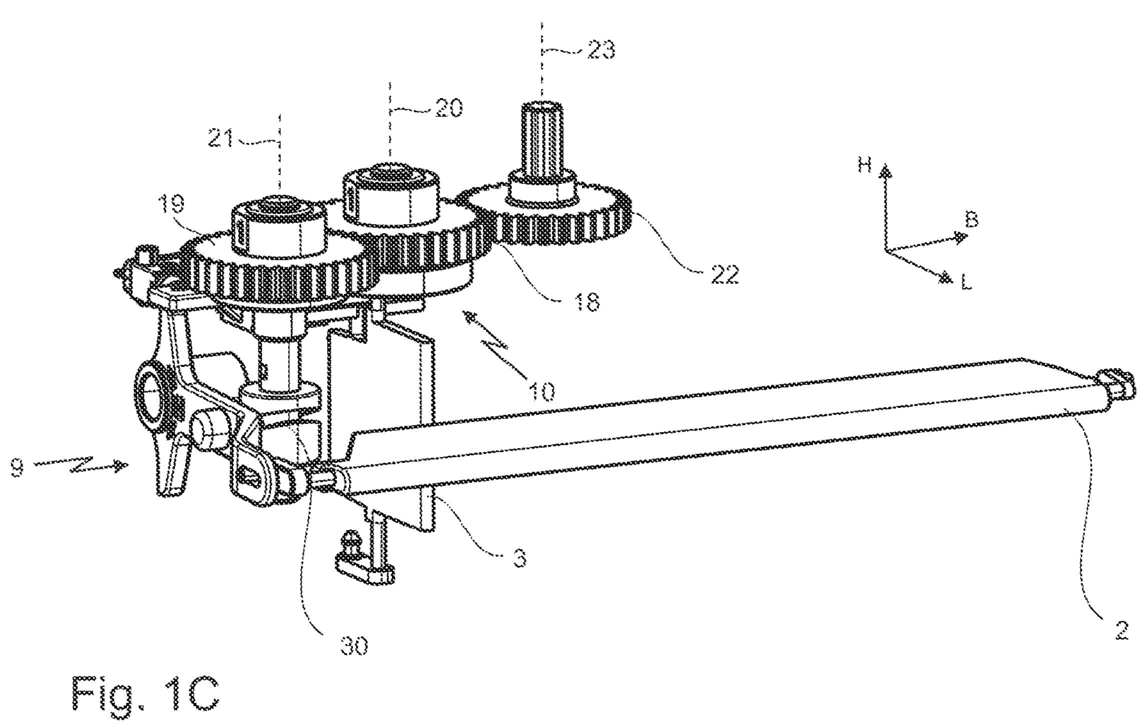
FIG. 1C a section of FIG. 1A.
Figure 1D:
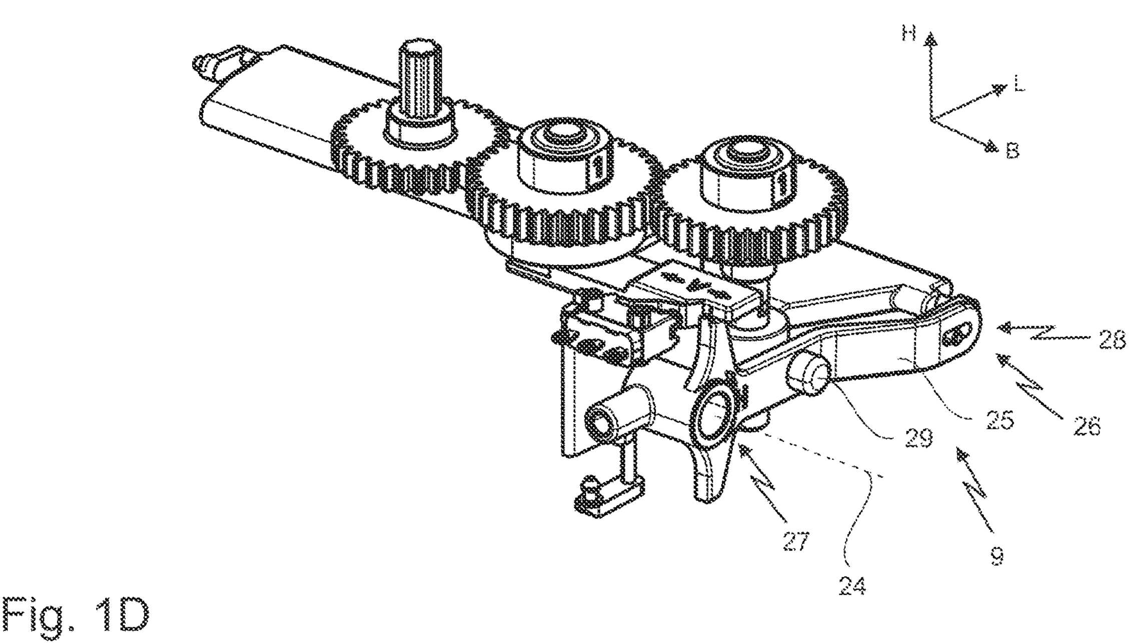
FIG. 1D a section of FIG. 1B.

FIG. 1C shows the design shown in FIG. 1A again, whereby some components have been omitted. In FIG. 1D, the design shown in FIG. 1B is illustrated again, whereby some components have been omitted.

FIGS. 1A to 1D can be used to illustrate the drive unit 7 in more detail, in a first embodiment.

According to a preferred embodiment, it may be provided that the drive unit 7 has a first gear wheel 18, which is rotatable about a first axis of rotation 20, and a second gear wheel 19, which is rotatable about a second axis of rotation 21.

Preferably, the drive unit 7 is in operative contact with a first actuating element 9 and with a second actuating element 10. The first actuating element 9 is connected on the one hand to the drive unit 7 and on the other hand to the first movably adjustable component 2. The second actuating element 10 is connected on the one hand to the drive unit 7 and on the other hand to the second movably adjustable component 3.

Further preferably, the actuator 8 can be at least operatively connected directly or indirectly to the drive unit 7. An indirect connection is shown in FIGS. 1C and 1D in that a third gear wheel 22, which is rotatable about a third axis of rotation 23, is provided. Preferably, the third gear wheel 22 is in contact with the first gear wheel 18 or the second gear wheel 19, so that a rotation of the third gear wheel 22 can be transmitted to the other gear wheels 18, 20. The third gear wheel 22 may also be in contact with the first gear wheel 18 and the second gear wheel 19, so that the third gear wheel 22 drives both gear wheels 18, 19.

Alternatively, seen as a direct connection, it may also be provided that the actuator 7 directly drives the first gear wheel 18 or the second gear wheel 20.

Particularly preferably, the first axis of rotation 19 and the second axis of rotation 21 are arranged parallel to each other; further preferably, the first axis of rotation 19 and the second axis of rotation 21 are parallel to each other and parallel to the height direction H. The third axis of rotation 23 is parallel to the axes of rotation 19, 21, but can alternatively be perpendicular or at a different angle to these axes of rotation 19, 21, whereby, for example, the gear wheels can be designed as bevel gears. In principle, the torque transmission can be realised via known gear wheel geometries, belt drives, friction wheels or similar.

The actuating elements 9, 10 and their connection to the drive unit 7 or the toothed wheels 18, 20 of the drive unit 7 are shown in more detail in the other figures.

The first actuating element 9 is arranged about a fourth axis of rotation 24. Preferably, the fourth axis of rotation 24 is stationary with respect to the kinematic component 1, i.e. the fourth axis of rotation 24 does not change its position with respect to the kinematic component 1. For this purpose, the first actuating element 9 can be arranged on a housing, on the air duct 17 or the like.

Further preferably, the first actuating element 9 is connected to the first movably adjustable component 2 in such a way that the first movably adjustable component 2 is also actuated by movements of the first actuating element 9. For this purpose, the first actuating element 9 preferably has a lever element 25, which preferably extends in a longitudinal direction L. A first end 26 is connected to the first movably adjustable component 2, for example by means of a slot-and-pin connection 28, and a pivot point of the lever element 25, for example the second end 27, is connected to the fourth axis of rotation 24. The pivot point of the lever element 25 can preferably be arranged at any position with respect to the lever element 25.

Preferably, a pin element 29 is provided, which preferably extends away from the lever element 25 or the first actuating element 9, for example in the width direction B or at an angle thereto. Preferably, the pin element 29 is fixedly connected to the first actuating element 9. Further preferably, the pin element 29 is arranged between the fourth axis of rotation 24 or the second end 27 and the first end 26 when viewed in the longitudinal direction L. Alternatively, the pin element 29 can also be arranged at a different position on the lever element 25. For example, it is possible that the fourth axis of rotation 24 is arranged between the pin element 29 and the first end 26. This means that the first end 26 and the pin element 29 are arranged on opposite sides with respect to the fourth axis of rotation 24 on the lever element 25. Preferably, the pin element 29 is in connection with a first link 30 (not shown here). Preferably, the pin element 29 extends along a width direction B.

Figure 2A:
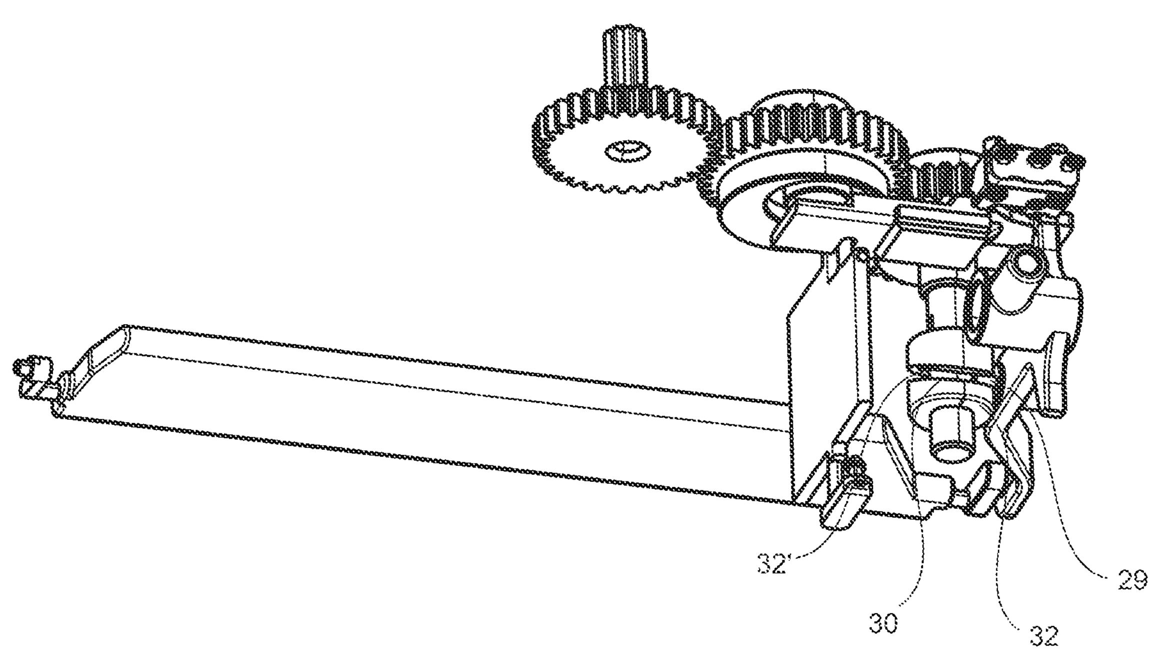
FIG. 2A a perspective view of FIG. 1D from below.

FIG. 2A shows such a connection in more detail. The first link 30 is such that a cylindrical component 32 is provided with a notch 32', which forms the first link 30. The notch 32' is such that it is arranged on the entire cylindrical component 32 in the circumferential direction and is closed in itself, i.e. has no end, which enables endless rotary movement. The notch is wave-shaped and/or step-shaped and/or helical and/or spiral-shaped towards or in the height direction H, so that an upward and downward movement of the first movably adjustable component 2 is made possible, since the pin element 29 follows this link 30, transmits the movement to the first actuating element 9 and this movement in turn to the first movably adjustable component 2.

Figure 2B:
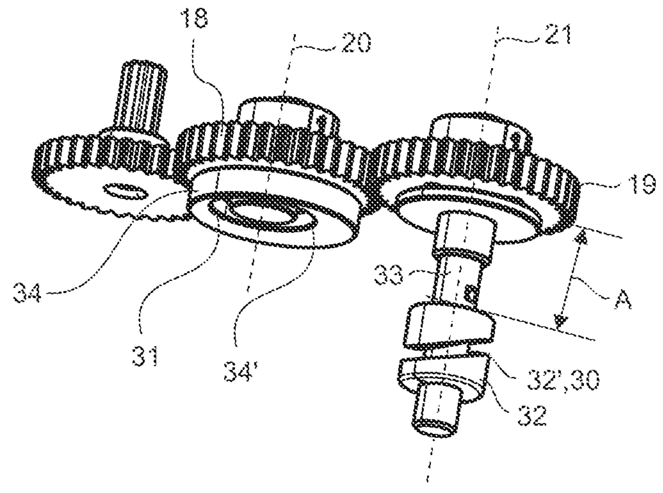
FIG. 2B a section of FIG. 2A.
Figure 2C:
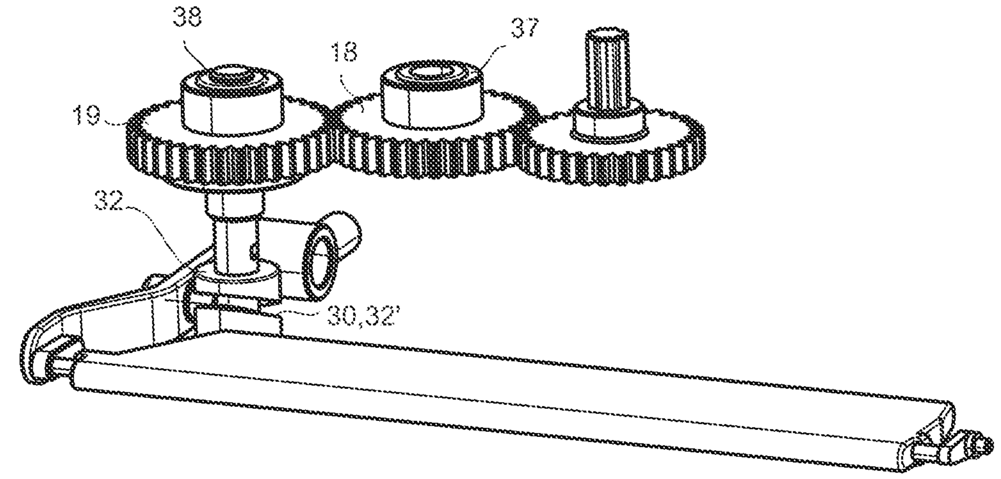
FIG. 2C a section of FIG. 1C.

Another illustration can also be seen in FIG. 2B. The cylindrical component 32 is connected to the second gear wheel 19 in such a way that when the second gear wheel 19 rotates in one direction of rotation DR1, DR2, the cylindrical component 32 undergoes a corresponding rotation and when it rotates in the opposite direction of rotation DR2, DR1 it does not undergo any rotation. This is preferably achieved by means of a freewheel element 37, 38. Preferably, the cylindrical component 32 is spaced at a distance A in height direction H from the second toothed wheel 19, which is preferably possible by means of a connecting element 33. The connecting element 33 is connected on the one hand to the second gear wheel 19 in the manner described and on the other hand to the cylindrical component 32. A further illustration can be seen in FIG. 2C.

FIG. 2B also shows a further guide by means of a second link 31 with respect to the first gear wheel 18. The second link 31 is a notch 34' in a further cylindrical component 34, which is preferably arranged below the first gear wheel 18, i.e. the cylindrical component 34 is arranged in the height direction H below the first gear wheel 18.

Particularly preferably, the notch 34' or the second link 31 is a circular ring, which is preferably arranged eccentrically to the first axis of rotation 20. Alternatively, the second link 31 is oval-shaped, heart-shaped or the like, whereby the embodiments given are intended merely as examples. In principle, any possible shape can be provided for the second link 31 which allows a pin element 35 to be displaced in the width direction B. Likewise, the second link 31 is designed such that the pin element 35 can be guided without snagging or blocking. Preferably, the second link 31 can be arranged eccentrically with respect to the axis of rotation 20. The properties of the second link 31 can also be transferred to other links 30, 42 and can be provided.

Figure 2D:
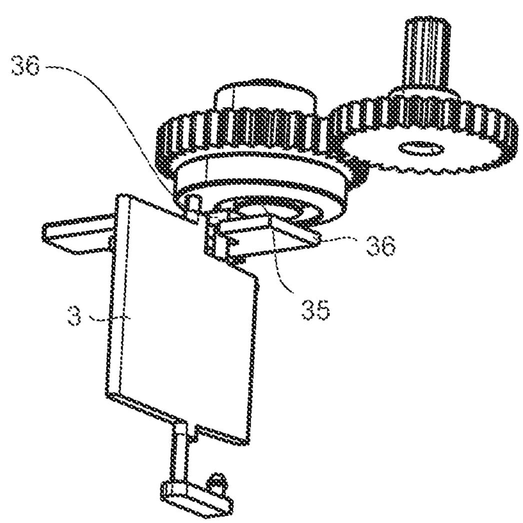
FIG. 2D a section of FIG. 2A.
Figure 3A:
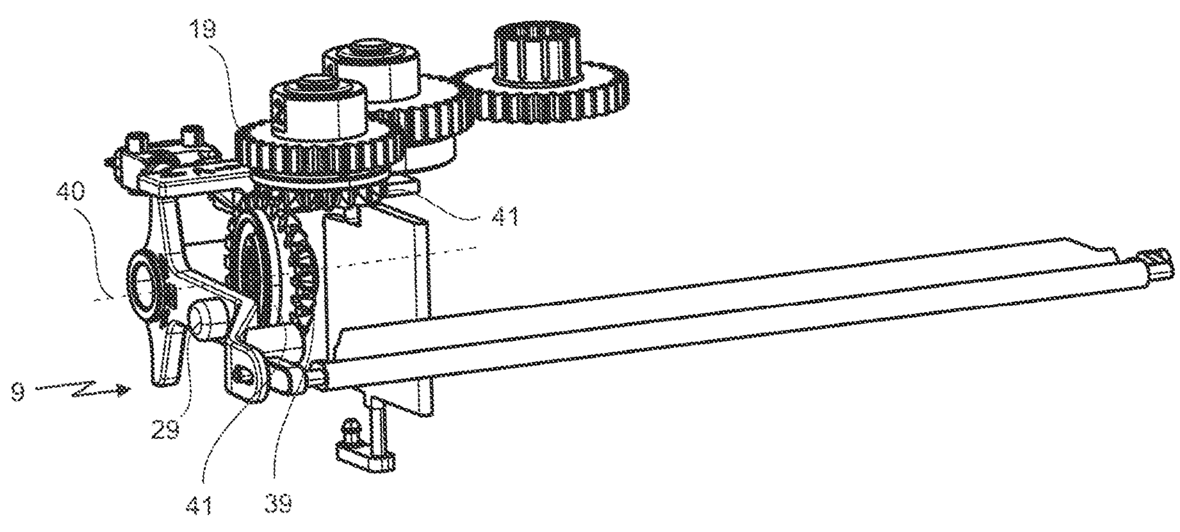
FIG. 3A a further embodiment of a section of the kinematic component in a perspective view from the front.
Figure 3B:
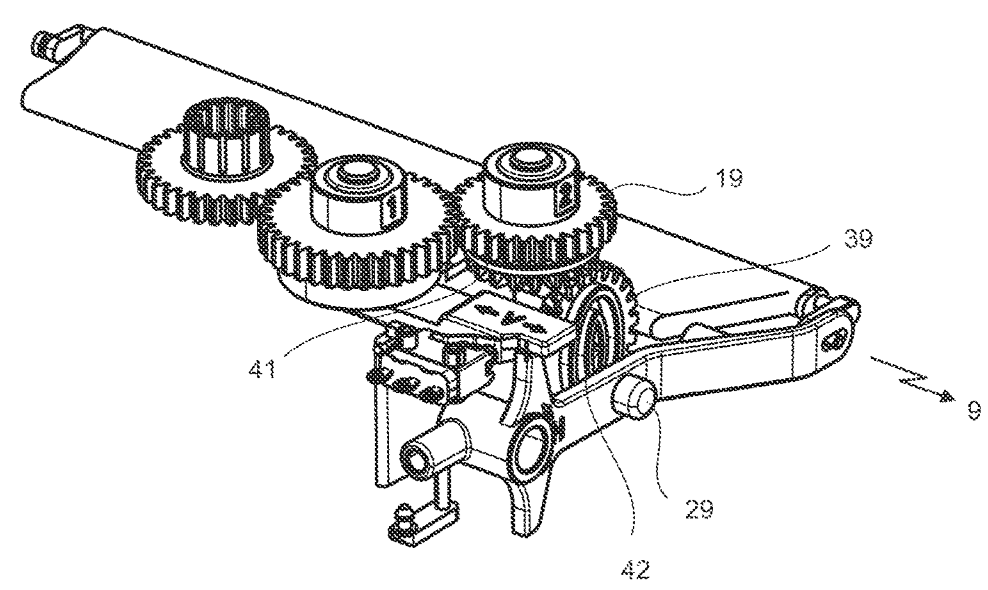
FIG. 3B a perspective view of FIG. 3A from above and behind.
Figure 3C:
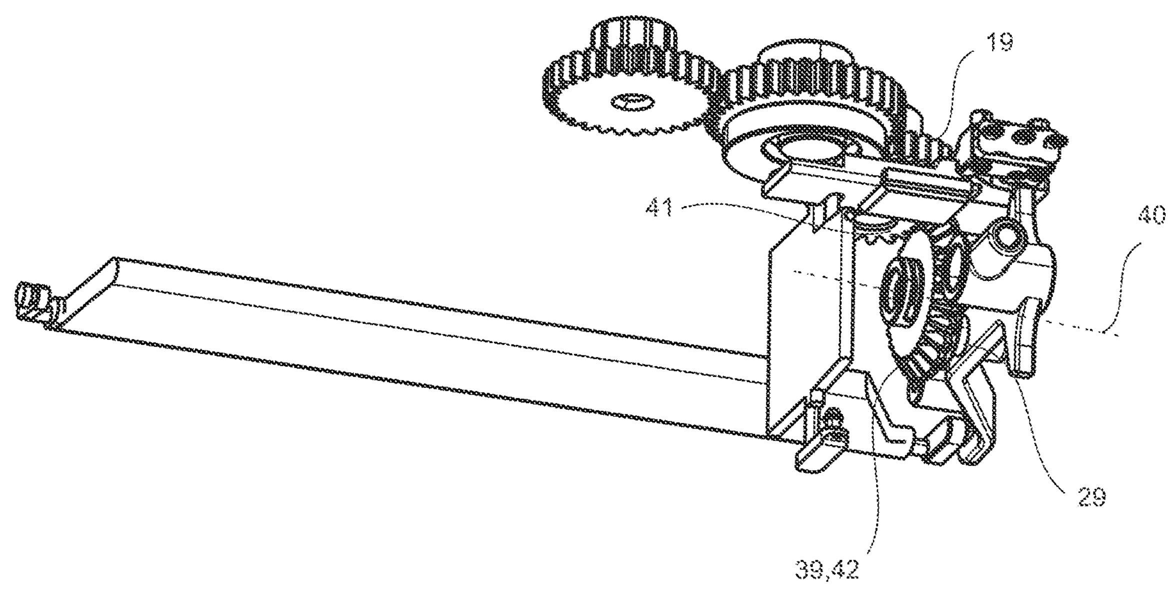
FIG. 3C a perspective view of FIG. 3A from below.
Figure 3D:
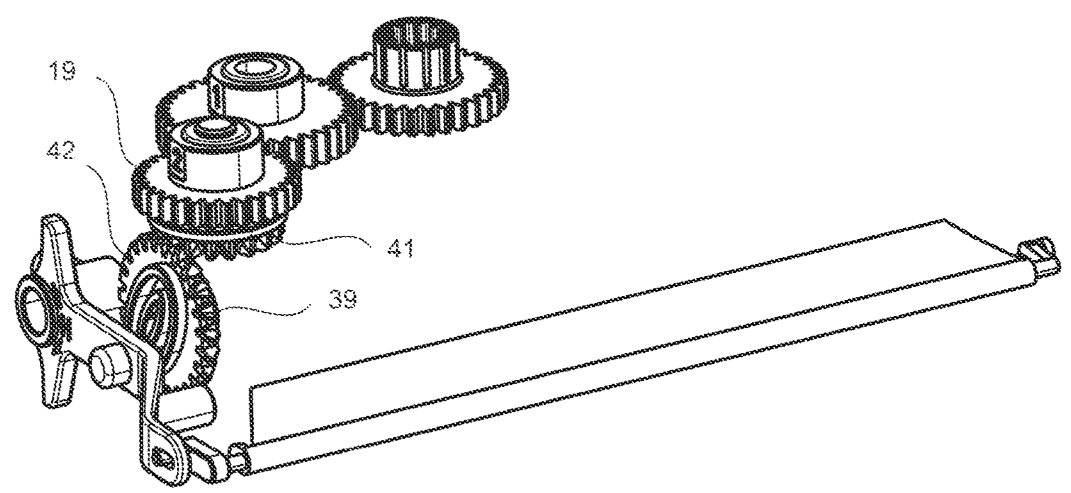
FIG. 3D a section of FIG. 3A.
Figure 3E:
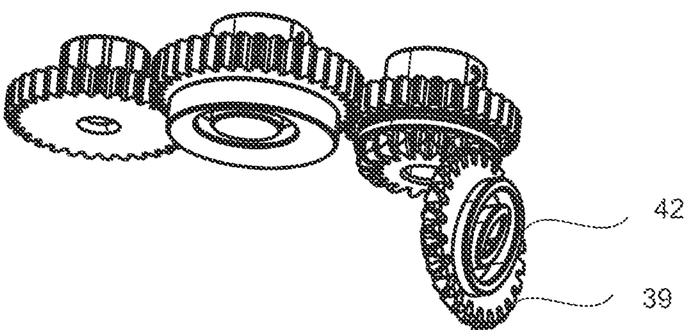
FIG. 3E a section of FIG. 3C.

The pin element 35 can also engage in the second link 31, which can be moved by the moved second link 31 and can then transfer the movement to the second movably adjustable component 3 accordingly. The pin element 35 is shown, for example, in FIG. 2D. As can be seen further, the pin element 35 is directly or indirectly connected to the second movably adjustable component 3.

Furthermore, a sliding element 36 is provided, which preferably comprises the pin element 35. Preferably, the sliding element 36 is designed in such a way that it is linearly displaceable by the rotary movement of the link 31 or the movement of the pin element 35, preferably in the direction of the width direction B. Particularly preferably, the sliding element 35 has a receptacle 36 in which the second movably adjustable component 3 engages and can thus be moved accordingly with the movement of the sliding element 35.

According to a particularly preferred embodiment, it may be provided that the first gear wheel 18 and the further cylindrical component 34 are connected to one another by means of a first freewheel element 37. Further preferably, the second gearwheel 19 and the connecting element 33 or the cylindrical component 32 are connected to one another by means of a second freewheel element 38. The freewheel elements 37, 38 are preferably designed and intended to couple the elements to one another only in one direction of rotation DR1, DR2, so that a rotary movement of the gearwheel 18, 19 can be transmitted to the further element. This means that the corresponding elements are not connected to each other in the opposite direction of rotation DR1, DR2, so that a rotary movement cannot be transmitted. This allows the independent actuation of the movably adjustable components 2, 3 to be further developed.

The freewheel element 37, 38 can therefore be regarded as a clutch that only acts in one direction of rotation DR1, DR2.

The freewheel elements 37, 38 can be designed in a wide variety of ways. Purely by way of example and not exhaustively, the freewheel elements 37, 38 can be at least one of the following examples: a freewheel operating in a magnetic manner, a freewheel with clamping rollers, a freewheel with pawl(s), a spring-wound freewheel, a freewheel damper, a sleeve freewheel, or any combination of the foregoing.

Instead of the cylindrical component 32, by means of which the first actuating element 9 can be actuated, it can be provided according to an alternative embodiment that a fourth gearwheel 39 is provided, which is rotatable about a fifth axis of rotation 40, whereby the first actuating element 9 can be actuated by means of the fourth gearwheel 39.

This embodiment is shown, for example, in FIGS. 3A to 3E, each of these figures showing a part of the kinematic component 1 or the device 4, in different representations.

For a more compact configuration, it is particularly preferred that the fifth axis of rotation 40 is perpendicular to the second axis of rotation 21 of the second gearwheel 19. A gear rim 41 is connected to the second gearwheel 19 or to the latter, which is intended to be operatively connected to the fourth gearwheel 39, so that movements of the second gearwheel 19 can be transmitted to the gear rim 41, depending on the direction of rotation DR1, DR2, and from the gear rim 41 to the first actuating element 9. It is also conceivable that the fifth axis of rotation 40 and the second axis of rotation 21 are not perpendicular to each other, but are arranged at an acute angle or obtuse angle to each other, depending on the reference axis or observation.

Preferably, the fourth gearwheel 39 is designed such that a third slotted link 41 is provided as an alternative to slotted link 32', in which the pin element 29 can be guided so that the first actuating element 9 can be moved accordingly. The third link 41 is preferably closed in itself. Preferably, the third link 41 can be circular or oval or have a different shape. Preferably, the third link 41 is designed in such a way that a movement is executed along the height direction H and can be followed, i.e. that the pin element 29 can be moved in or along the height direction H.

The referencing and detection of the reference positions will be discussed in more detail below.

For this purpose, it is preferred that the kinematic component 1 or the device 4 comprises a sensor unit 11, which is intended and designed to recognise the reference positions. Particularly preferably, the sensor unit 11 is intended and designed to recognise the reference positions of the movably adjustable components 2, 3. Preferably, the detection is in interaction with the movably adjustable components 2, 3 in a direct or indirect connection, for example by means of components arranged between them, such as the actuating elements 9, 10, which are operatively connected to the movably adjustable components 2, 3.

Figure 4A:
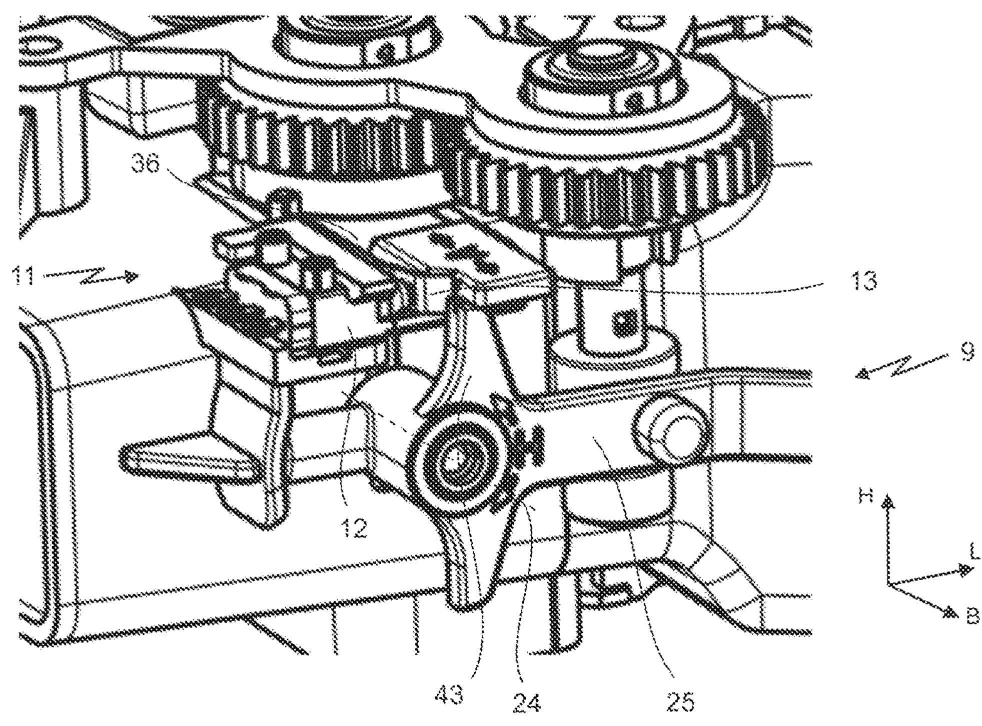
FIG. 4A a section of FIG. 1C.
Figure 4B:
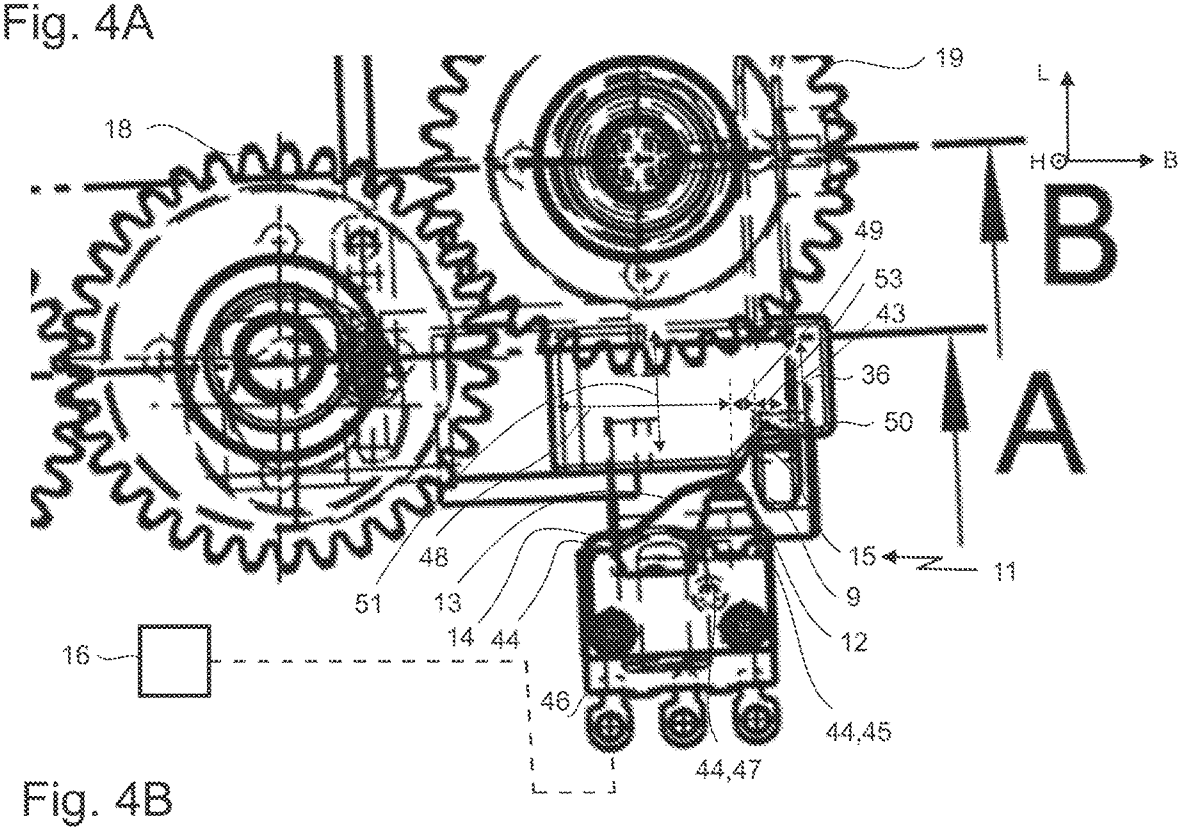
FIG. 4B a top view of FIG. 4A.

FIGS. 4A and 4B show the sensor unit 11 in more detail.

Preferably, the sensor unit 11 has a sensor 12. Particularly preferably, the sensor 12 is arranged in a fixed position with respect to the device 4 or with respect to the kinematic component 1. This means that the sensor cannot change or alter its position with respect to the kinematic component 1 or in the kinematic component 1.

According to a preferred embodiment, the sensor 12 can be designed as a Hall sensor, as a magnetic sensor, as a capacitive sensor, as an optical sensor or as a mechanically actuated sensor.

Preferably, the mechanically actuated sensor can be a pushbutton or tactile sensor. In order to actuate the mechanically actuated sensor, it may preferably be provided that the sensor unit comprises the sensor 12 and an elastically deformable actuating element 13, wherein preferably the elastically deformable actuating element 13 is at least operatively connected to the first movably adjustable component 2 and to the second movably adjustable component 3.

According to the figures shown, the sensor unit 11 has a mechanically actuated sensor 12, which is designed as a button, and an elastically deformable actuating element 13. However, it would also be conceivable to use other sensors.

The actuating element 13 has a first end 14, which is fixedly connected to the sensor 12 or arranged thereon, and preferably has a second end 15, which is at least operatively connected to the first movably adjustable component 2 and to the second movably adjustable component 3.

Further preferably, the actuating element 13 can be deformed in such a way that the actuating element 13 actuates the sensor 12, which can correspond to the respective reference position.

The elastically deformable actuating element 13 is operatively connected to the movable adjustable components 2, 3 in such a way that the actuating element 13 is elastically deformed by a movement or actuation of the movable adjustable components 2, 3.

It may be provided that the movably adjustable components 2, 3 are operatively connected to the actuating element 13 by means of the first actuating element 9 and by means of the second actuating element 10.

The sensor unit can be designed in such a way that, according to a preferred embodiment, the sensor is arranged in a fixed position with respect to the device. The actuating element is also preferably elongated. Preferably, the actuating element has a first end and a second end, wherein the first end is fixedly connected to the sensor or a further part of the device. Further preferably, the second end is at least operatively connected to the first movably adjustable component and the second movably adjustable component. The actuating element can be elastically deformed by the actuation or movement of the movably adjustable components. The second end of the actuating element can therefore be moved and deformed by the movably adjustable components.

Preferably, the first actuating element 9 is connected to the elastically deformable actuating element 31 by means of an actuating lever 43. Preferably, the actuating lever 43 is rigidly connected to the first actuating element 9, preferably rigidly connected to the lever element 25. Accordingly, the actuating lever 43 is also rotatable about the fourth axis of rotation 24 when the first actuating element 9 is actuated. Further preferably, the actuating lever 43 is designed such that it extends in the height direction H. Depending on the position of the sensor unit 11 or the sensor 12, this can be upwards or downwards. Preferably, the actuating lever 43 is arranged in front of the elastically deformable actuating element 13, which means that when the actuating lever 43 is rotated clockwise, the actuating lever 43 moves away from the elastically deformable actuating element 13 and when it is rotated anti-clockwise, it moves towards the elastically deformable actuating element 13 and deforms it accordingly.

Preferably, the second actuating element 10 is connected to the elastically deformable actuating element 31 by means of the sliding element 36. The sliding element 36 is translatably displaceable in the width direction B. It is preferable for the sliding element 36 to be designed in such a way that when it is displaced to the right, the actuating element 13 is deformed and moved towards the sensor 12. When it is moved to the left, the actuating element 13 is moved back to its original state.

FIG. 4B shows the sensor 12, the elastically deformable actuating element 13 and the sliding element 36 in more detail, allowing the mode of operation to be described in more detail.

As can be seen, the elastically deformable actuating element 13 is shaped like a terrace as seen along the width direction B. By "terraced" it can be understood that a plurality of terraces 44 spaced apart in the longitudinal direction L are provided, i.e. sections that extend along the width direction B or at an acute angle, for example less than 15°, to the width direction B. In the present case, the terraces 44 are increasingly spaced from left to right in relation to a first terrace 46. Preferably, the last terrace 45, i.e. the terrace arranged furthest to the right, is in operative contact with the actuating elements 9, 10. A further terrace 47 is designed and arranged to interact with the sensor 12.

The first terrace 46 is arranged in the area of the first end 14 of the elastically deformable actuating element 13.

The sliding element 36 extends substantially along the width direction B. Preferably, the sliding element 36 has a first section 48, a second section 49 and a third section 50 along the width direction B.

The first section 48 has a first extension 51 along the longitudinal direction L. The third section 50 has a third extension 53 along the longitudinal direction L. Preferably, the third extension 53 is smaller than the first extension 51. The second section 49 is intended and designed to connect the first section 48 and the third section 50, so that the extension of the second section 49 changes in the longitudinal direction L.

Figure 5A:
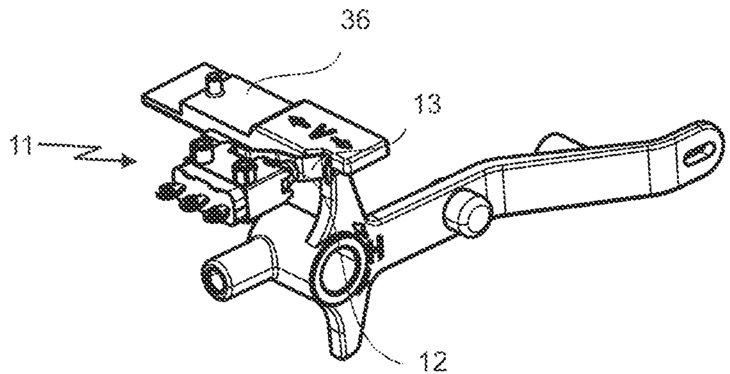
FIGS. 5A-5C different positions of the sliding element.
Figure 5B:
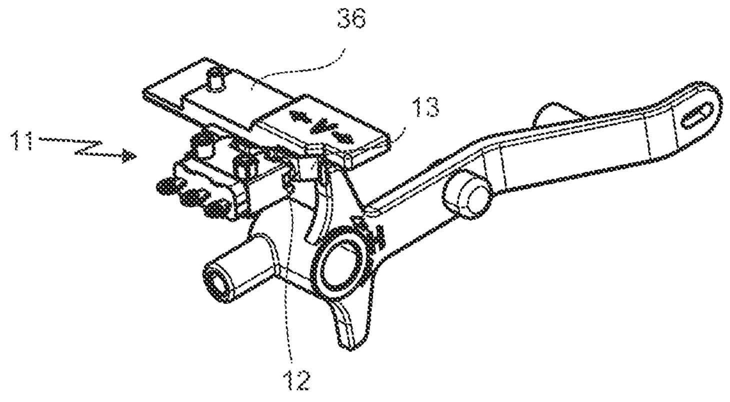
Figure 5C:
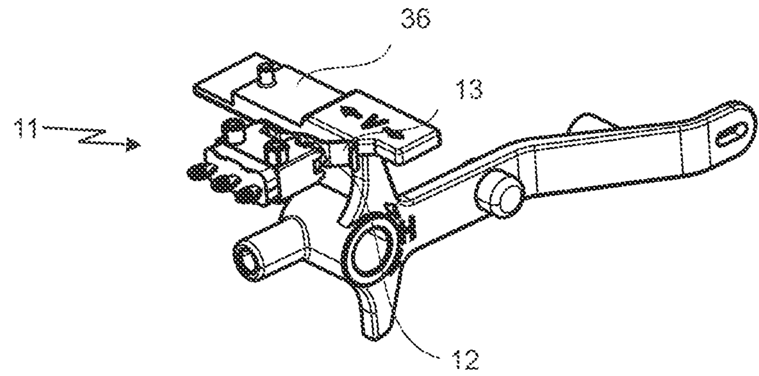

The sections 48, 49, 50 correspond to different positions of the sensor when in contact with the actuating element 13. The sections 48, 49, 50 can form a link for guiding the elastically deformable actuating element 13. It can be provided that in the third section 50 the sliding element 36 and the elastically deformable actuating element 13, in particular the second end 15, do not touch each other or touch in such a way that the sensor 12 is not actuated. If the sliding element 36 is moved to the right (=+B), the elastically deformable actuating element 13 comes into active contact with the second section 49 and is deformed accordingly, so that the elastically deformable actuating element 13 is moved in the direction of the sensor 12. If the elastically deformable actuating element 13 and the first section 48 are in contact, the sensor 12 is actuated. This is shown, for example, in FIGS. 5A to 5C.

Figure 4C:
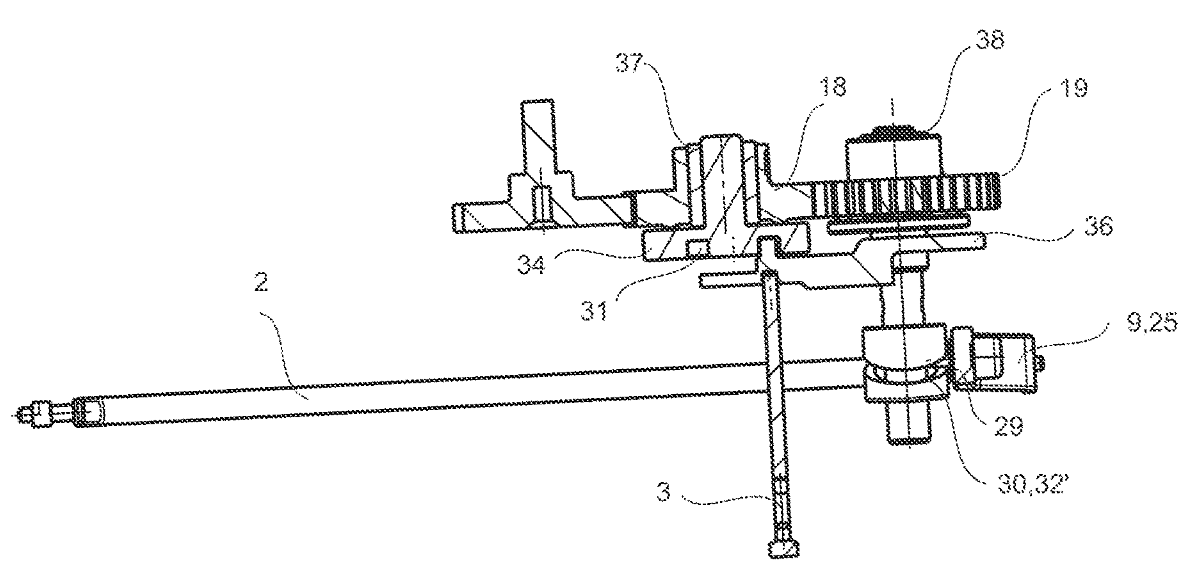
FIG. 4C the section A-A of FIG. 4B.
Figure 4D:
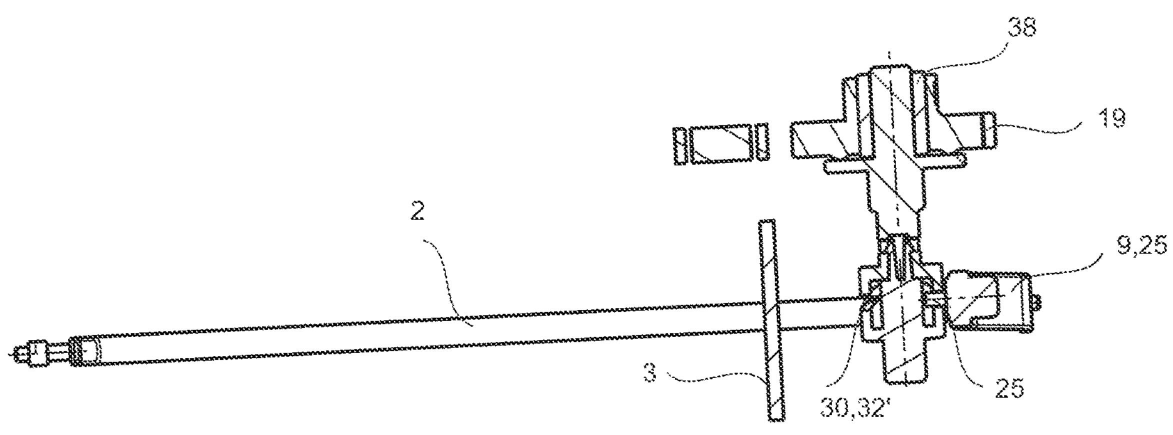
FIG. 4D the section B-B of FIG. 4B.

FIGS. 4C and 4D show the sections A-A and B-B.

Figures 6A, 6B, 6C:
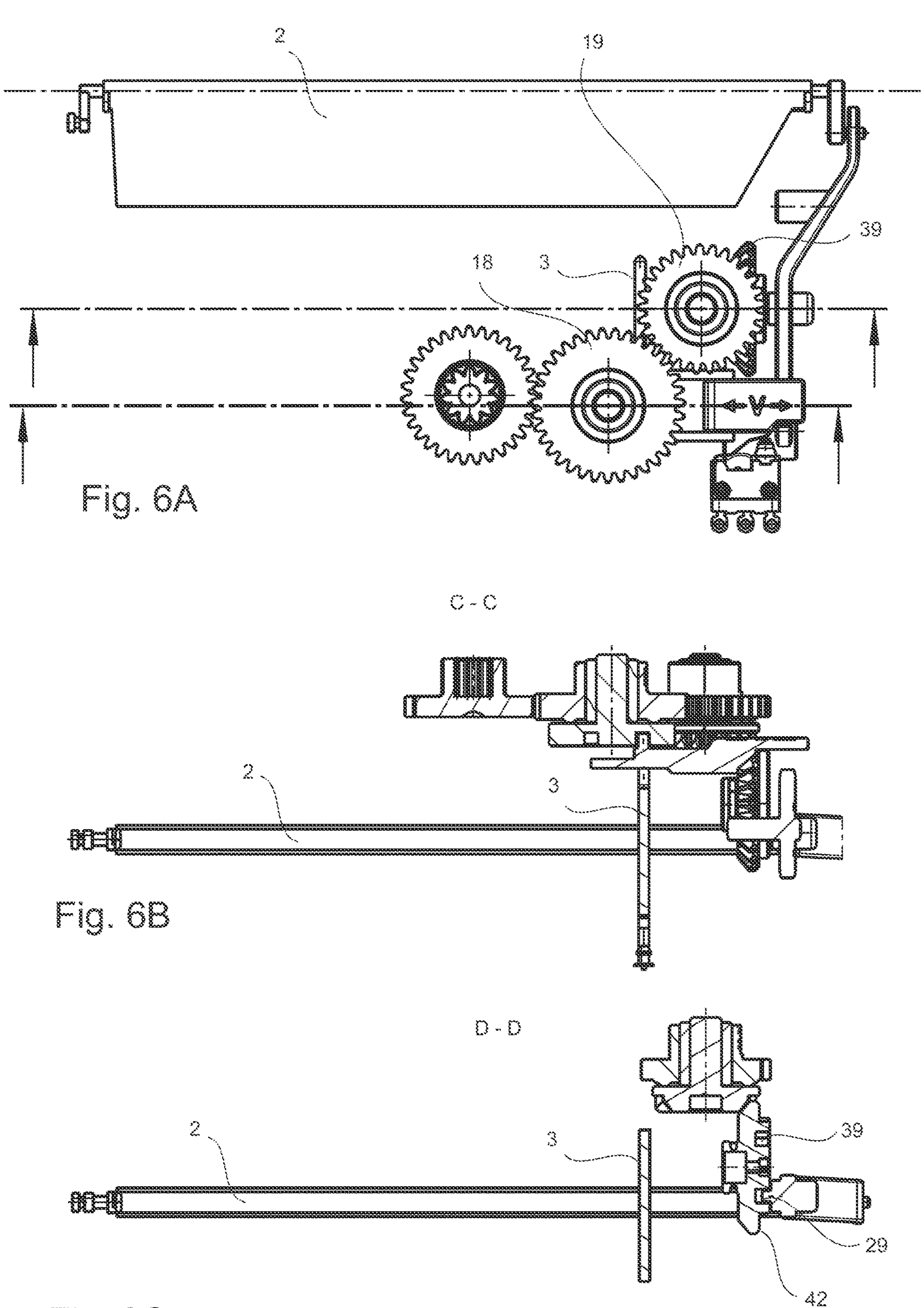
FIG. 6A a top view of FIG. 3B.
FIG. 6B the section C-C of FIG. 6A.
FIG. 6C the section D-D of FIG. 6A.

FIGS. 6A to 6C show the other embodiment, with the fourth gearwheel 39. The explanations regarding the other elements and components remain valid and can also be applied to this embodiment.

The sensor 12 is preferably an electrically acting sensor, which means that electrical signals are emitted when it is actuated. The sensor 12 is preferably a push-button or a push-button element. This means that when the button is actuated, a corresponding signal can be emitted, and when the button is not actuated, no signal is emitted.

The respective reference position corresponds to the position in which the button or sensor 12 is actuated and emits a corresponding signal. This and the actual direction of rotation DR1, DR2 can be used to determine which movably adjustable component 2, 3 is currently in this position.

Based on the recognition of the reference position and the assignment of the movably adjustable component 2, 3, the actuator now knows its current position, whereby the actuator 8 is or can be referenced. The actuator 8 preferably knows which positions it can reach with a certain number of steps, starting from the reference position.

In the event that both actuating elements 9, 10 actuate the sensor 12 because their position is just overlapping in the reference position, it can preferably be recognised by means of the evaluation unit 16 that the sensor 12 is still pressed, although one actuating element 9, 10 is moving. Accordingly, a signal can be output to the other actuating element or to the drive unit 7 in order to move the actuating element 9, 10, which is blocking the button, out of the reference position so that the other actuating element 10, 9 can be correctly referenced.

Figure 7:
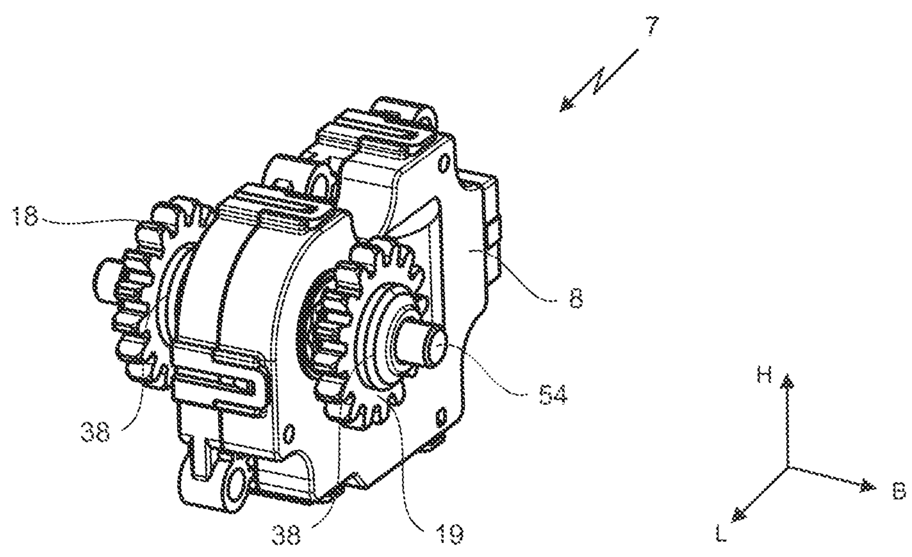
FIG. 7 an embodiment of the drive unit.

FIG. 7 shows another embodiment of a drive unit 7 with an actuator 8. Here, the actuator 8 is arranged in width direction B between the first gear wheel 18 and the second gear wheel 19, wherein the gear wheels 18, 19 are arranged on a common shaft 54. Further, freewheels 37, 38 are again provided, whereby the first gear wheel 18 rotates only in one direction of rotation DR1, DR2 and the second gear wheel rotates only in the further direction of rotation DR1, DR2.

All the features listed can be combined with one another in any desired manner.

All the features disclosed in the application documents are claimed as being essential to the invention, provided that they are new, either individually or in combination, compared with the prior art.

LIST OF REFERENCE SIGNS

1 Kinematic component
2 First movably adjustable component
3 Second movably adjustable component
4 Device
5 First reference position
6 Second reference position
7 Drive unit
8 Actuator, electric motor
9 First actuating element
10 Second actuating element
11 Sensor unit
12 Sensor
13 Elastically deformable actuating element
14 First end of the elastically deformable actuating element
15 Second end of the elastically deformable actuating element
16 Evaluation unit
17 Air duct
18 First gear wheel
19 Second gear wheel
20 First axis of rotation
21 Second axis of rotation
22 Third gear wheel
23 Third axis of rotation
24 Fourth axis of rotation
25 Lever element
26 First end
27 Second end
28 Slot-and-pin connection
29 Pin element
30 First link
31 Second link
32 Cylindrical component
32' Notch
33 Connecting element
34 Further cylindrical component
35 Pin element
36 Sliding element
37 First freewheel element
38 Second freewheel element
39 Fourth gear wheel
40 Fifth axis of rotation
41 Gear rim
42 Third link

43 Operating lever
44 Terrace
45 Last terrace
46 First terrace
47 Further terrace
48 First section
49 Second section
50 Third section
51 First extension
53 Third extension
54 Shaft
DR1 First direction of rotation
DR2 Second direction of rotation
L Longitudinal direction
B Width direction
H Height direction

What is claimed is:

1. A kinematic component, comprising:

a first movably adjustable component, wherein the first movably adjustable component is planar and is movably adjustable about a first axis;

a second movably adjustable component, wherein the second moveably adjustable component is planar and is movably adjustable about a second axis that is perpendicular to the first axis; and a device that is provided and designed to adjust each of the movably adjustable components independently of one another, wherein the device is provided and designed to recognize a first reference position of the first movably adjustable component and a second reference position of the second movably adjustable component, wherein the device is further provided for referencing the first movably adjustable component upon recognition of the first reference position and referencing the second movably adjustable component upon recognition of the second reference position, and wherein the first reference position and the second reference position are each the position at which the respective movably adjustable component is assigned a certain position of the respective movably adjustable component.

2. A method for referencing a kinematic component according to claim 1, wherein by the following method steps:

a. actuation of a kinematic component;

b. recognizing an actuation of a sensor unit by recognizing a reference position;

c. processing the recognized reference position as a function of a respective direction of rotation in order to recognize which movably adjustable component is to be referenced; and d. referencing the recognized movably adjustable component.

3. The kinematic component according to claim 1, wherein the first reference position corresponds to a predetermined position of the first movably adjustable component and the second reference position corresponds to a predetermined position of the second movably adjustable component.

4. The kinematic component according to claim 3, wherein the predetermined position of the first movably adjustable component corresponds to a maximum position of the first movably adjustable component and the predetermined position of the second movably adjustable component corresponds to a maximum position of the second movably adjustable component.

5. The kinematic component according to claim 1, wherein the device comprises a drive unit that is connected to a rotatable actuator and to each of the first movably adjustable component and the second movably adjustable component, wherein the drive unit can be actuated by means of rotation of the rotatable actuator, and wherein the first movably adjustable component can be adjusted when the actuator is rotated in a first direction and the second movably adjustable component can be adjusted when the actuator is rotated in a second direction of rotation, which is opposite to the first direction of rotation.

6. The kinematic component according to claim 5, wherein the rotatable actuator is an electric motor.

7. The kinematic component according to claim 5, wherein the device has a first actuating element and a second actuating element, the first actuating element being connected to the drive unit and the first movably adjustable component and the second actuating element being connected to the drive unit and the second movably adjustable component.

8. The kinematic component according to claim 1, wherein the device comprises a sensor unit that is provided and designed to recognize the reference positions.

9. The kinematic component according to claim 8, wherein an evaluation unit is provided, which is provided and designed to reference at least one of the movably adjustable components by recognizing the respective reference position thereof on a basis of a respective direction of rotation.

10. The kinematic component according to claim 8, wherein at least one of the following is satisfied:

the sensor unit comprises at least one sensor; and the sensor unit is in active contact with at least one of a first actuating element and a second actuating element.

11. The kinematic component according to claim 10, wherein the at least one sensor is stationary with respect to the device.

12. The kinematic component according to claim 10, wherein the at least one sensor is one or more of a Hall sensor, a magnetic sensor, a capacitive sensor, and a mechanically actuated sensor.

13. The kinematic component according to claim 10, wherein the at least one sensor is at least operatively connected to the first movably adjustable component and to the second movably adjustable component and is designed and provided for recognizing the reference positions on a basis of the interaction with the movably adjustable components.

14. The kinematic component according to claim 10, wherein the sensor unit further comprises an elastically deformable actuating element, and wherein the actuating element is at least operatively connected to the first movably adjustable component and to the second movably adjustable component.

15. The kinematic component according to claim 14, wherein the elastically deformable actuating element has a first end, which is fixedly connected to the sensor, and has a second end, which is at least operatively connected to the first movably adjustable component and to the second movably adjustable component.

16. A kinematic component, comprising:

a first movably adjustable component;

a second movably adjustable component; and a device that is provided and designed to adjust the movably adjustable components independently of one another, wherein the device is provided and designed to recognize a first reference position of the first movably adjustable component and a second reference position of the second movably adjustable component, wherein the device is further provided for referencing the first movably adjustable component upon recognition of the first reference position and referencing the second movably adjustable component upon recognition of the second reference position, wherein the first reference position and the second reference position is the position of which the movably adjustable component is assigned a certain position of the movably adjustable component, wherein the device comprises a sensor unit that is provided and designed to recognize the reference positions, wherein the sensor unit at least one of:

comprises at least one sensor; and is in active contact with at least one of a first actuating element and a second actuating element, and wherein the sensor unit further comprises an elastically deformable actuating element at least operatively connected to the first movably adjustable component and to the second movably adjustable component.

* * * * *